Figure 1:
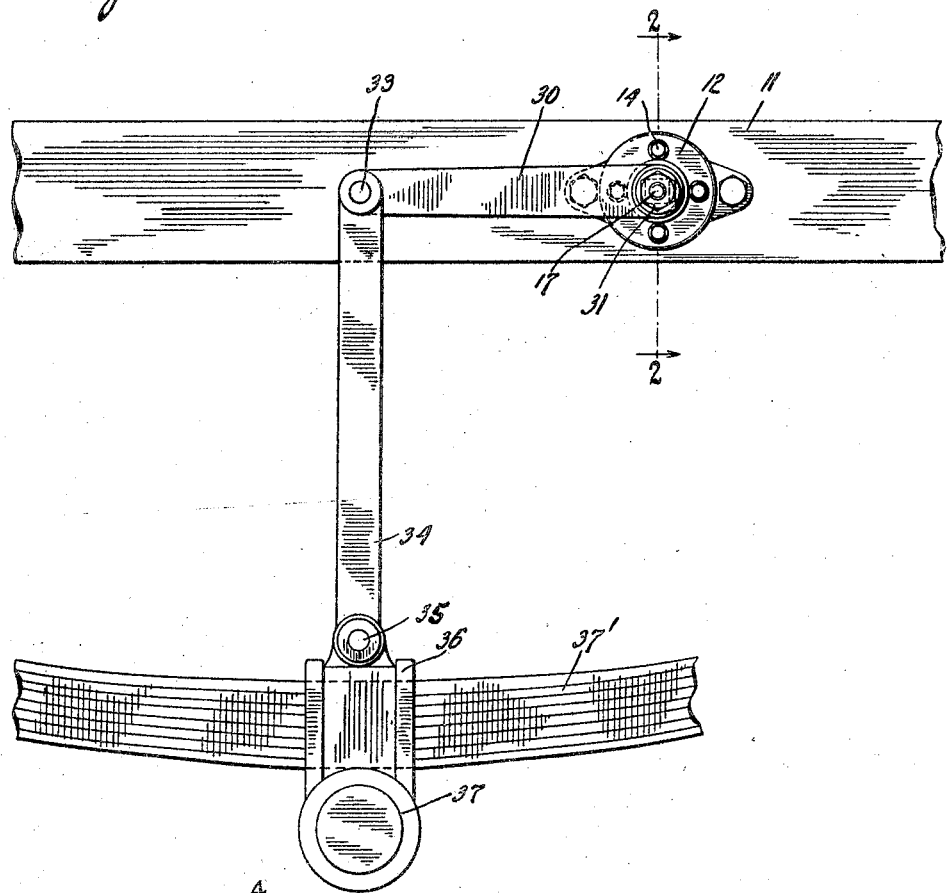

Oct. 30, 1923.

P. S. MORGAN

SHOCK ABSORBER

Filed Oct. 27, 1921

1,472,420

2 Sheets-Sheet 1

Inventor
P. S. Morgan
By his Attorney

Patented Oct. 30, 1923.

1,472,420

UNITED STATES PATENT OFFICE.

PORTER S. MORGAN, OF NORWALK, CONNECTICUT.

SHOCK ABSORBER.

Application filed October 27, 1921. Serial No. 510,888.

*To all whom it may concern:*

Be it known that I, PORTER S. MORGAN, a citizen of the United States, and resident of Norwalk, in the county of Fairfield and State of Connecticut, have invented certain new and useful Improvements in Shock Absorbers, of which the following is a specification.

The present invention relates to improvements in shock absorbers, that is to say to devices for modifying or controlling the action of the supporting springs of vehicles. The invention pertains more particularly to that type of shock absorbers in which the action of the vehicle springs is retarded by a cushioning fluid, preferably a liquid, or, in other words, the invention has reference to a hydraulic shock absorbing mechanism.

Devices of this type usually comprise a closed casing, in the form of a cylinder, in which a piston, acting upon liquid, is reciprocably arranged, the casing being mounted upon one of the relatively movable elements of the vehicle and the piston rod being attached to the other one of said elements. Serious difficulties have been experienced with these devices mainly for the reason that the reciprocating piston rod wears out the stuffing box or boxes of the device and also because of the fact that the device has an inherent inertia, due to the weight of the piston and its rod. Other difficulties are due to the fact that in these devices the stroke of the piston corresponds to the relative travel between the vehicle body and the running gear, and, as there is practically a continuous relative movement between these elements, the piston is apt to wear out the cylinder wall, thereby causing a leakage of the fluid in the cylinder.

The main object of the present invention is to overcome the difficulties mentioned, in that it provides a shock absorber which lacks the piston rod and provides a packing which is in no way influenced by the movement of the piston of the device.

A further object of the invention is to so arrange the piston in the shock absorber casing and combine the same with the other elements of the device that the linear movement of the piston is brought about by the oscillating movement of a bodily stationary spindle, with the result that the stuffing box of the device will at all times maintain a fluid tight joint about the said spindle.

A further object of the invention is to insert a system of levers between the spindle and one of the relatively movable elements of the device, whereby the stroke of the piston is considerably smaller than the extent of the relative movement between the vehicle elements.

A still further object of the invention is to so arrange the piston and combine the same with the other elements of the device that the latter has no inherent inertia, the result being that the shock absorber is more sensitive in its action.

Another object of the invention is to so construct the shock absorber that it modifies and controls the action of the vehicle springs both in the direction in which they move in taking up the shock incident to meeting an obstruction in the road and on their rebound. The invention is not limited, however, to this type of device, such devices as permit the free yielding of the springs under compressive stresses but modify their action on their rebound coming within the purview of the invention as defined in the appended claims.

A further object of the invention is to so construct the shock absorber that its retarding action may be varied at will without disassembling the elements thereof.

A still further object of the invention is to provide a shock absorber which is extremely simple in construction, efficient in operation, and one which is capable of manufacture on a commercial scale, or in other words one which is not so difficult to construct as to be beyond the reasonable cost of such a contrivance.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 3:
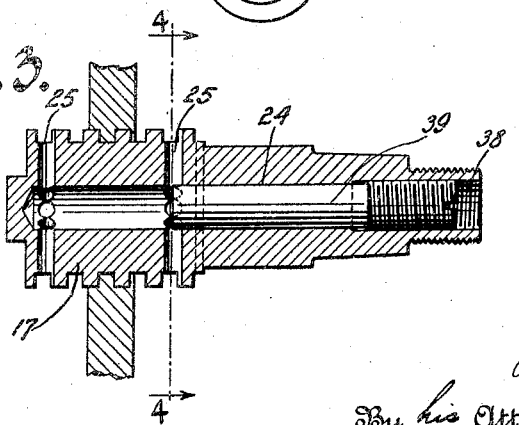
Figure 4:
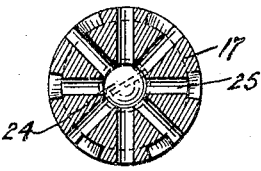
Figure 2:
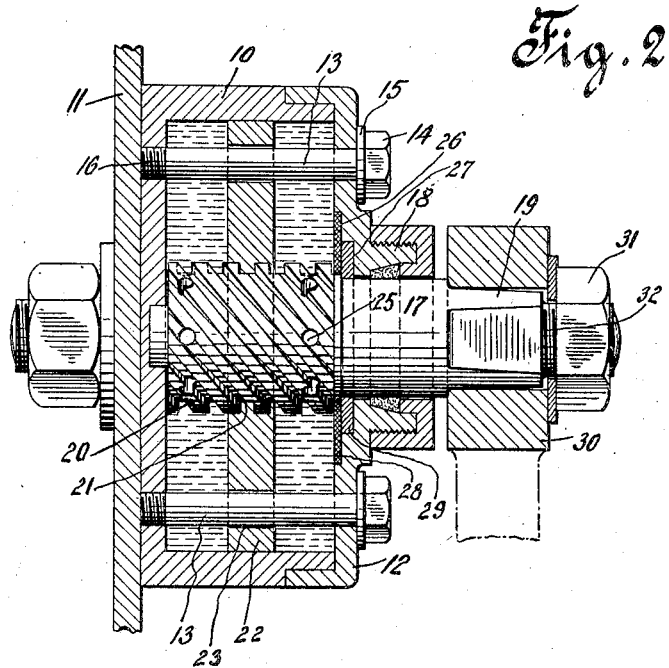

Figure 1 is a side elevation of a shock absorber constructed in accordance with the present invention, the same being shown mounted upon a vehicle; Fig. 2 is a section taken on line 2—2 of Fig. 1, on a larger scale; Fig. 3 is a longitudinal section taken through the spindle, associated with the piston; and Fig. 4 is a section taken on line 4—4 of Fig. 3.

In the drawings, the numeral 10 indicates a cylinder, which is bolted or otherwise attached to the body portion 11 of the vehicle. The cylinder is closed by a head 12, which is held in place by means of screw bolts 13, having heads 14. Between these heads and the cylinder head are interposed washers 15, for the well known purpose, the bolts extending through the cylinder head in parallel relation to the longitudinal axis of the cylinder and being screwed into the bottom of the latter, as shown at 16. A screw-threaded spindle 17 is centrally and rotatably mounted in the cylinder, it extending through a stuffing box 18 on the cylinder head and being provided outside of the cylinder with a polygonal portion 19, that is, preferably, tapered, as clearly shown in Fig. 2 of the drawings. The spindle is provided on that portion, which is disposed within the cylinder, with a multiple screw-thread 20 of any suitable configuration, and with these threads mesh threads 21 in the central bore of a piston 22 within the cylinder. This piston is provided with apertures 23, through which extend the bolts 13 above referred to, guiding the piston in its reciprocating movement. The spindle is provided with a longitudinal bore 24 (Fig. 3), communicating with radial channels 25 adjacent both ends of the screw-threaded portions of said spindle. In the inner face of the head 12 are provided two annular grooves, denoted by the numerals 26 and 27, said grooves surrounding the spindle and having seated therein washers 28 and 29, respectively, which contact with the said spindle. The washer 29 is, preferably, made of metal, while the washer 28 is made of suitable packing material, such as leather, its exposed face being flush with the inner face of the head 12.

Over the polygonal end 19 of the spindle is fitted a lever 30, kept in place by a nut 31, which meshes with threads 32 on the outer end of the spindle. This lever is pivoted at 33 to one end of a rigid link 34, the other end of which is fulcrumed at 35 to a clip 36, the latter being attached to the running gear 37 of the vehicle and serving at the same time to keep the main springs 37' of the vehicle in position.

The outer end of the bore 24 in the spindle 17 is screw-threaded, as shown at 38, and with these threads mesh those of a plug 39, which is adapted to regulate the channels adjacent the head 12.

The operation of this device is as follows:

In the normal positions of the springs 37' of the vehicle, the lever 30 extends substantially horizontally and the link 34 substantially vertically, the piston 22 being in its central position in the cylinder, as clearly shown in Fig. 2 of the drawings. The piston divides thus the cylinder into two compartments, which are wholly filled with a suitable fluid, such as oil, the two compartments communicating through the channels 25 and the bore 24. Upon relative movement between the vehicle body and the running gear, the spindle 17 is given a partial turn, which results in a linear movement of the piston 22 in the corresponding direction. This linear movement is retarded by the incompressible fluid in the cylinder moving from one of the compartments therein to the other one through the channels 25 and the bore 24. On the rebound of the springs a similar action takes place, the piston moving in the opposite direction. In the normal operation of the vehicle, that is to say when normal shocks or jars occur on the road, the piston will not travel so far that it would cover the channels 25. When, however, an excessive shock occurs, the piston will partly or wholly cover one set of channels and thereby greatly retard the action of the springs at the end of their compression stroke, retarding and checking effectively an excessive rebound, as the channels are closed and the liquid can move from one compartment to the other one by leakage only. In this manner discomfort to those riding in the vehicle and possible damage to the springs is effectively prevented.

As above stated, the channels adjacent the head may be varied in size by the plug 39 for the purpose of controlling the flow of the fluid in the cylinder and thereby changing, at will, the resistance to the movement of the piston. As the change may be made without disassembling the elements of the shock absorber, it may be effected quickly according to the requirements.

Attention is called to the fact that the fluid under pressure in the cylinder has a tendency to force the packing washers 28 and 29 against the cylinder head, thereby effectively preventing a leakage of fluid from the cylinder. In the devices heretofore in use the fluid under pressure usually has a tendency to blow the packing out of its place. In the present construction the liquid can hardly reach the packing in the stuffing box at all, it being prevented from doing so by the said washers.

It is to be observed that in the device herein described the piston has no inherent inertia, as it is comparatively light and does not move freely in the cylinder. The result is that the shock absorbers are balanced and their action is entirely independent of the momentum of the elements thereof.

It is obvious that, while herein the cylinder of the shock absorbing device has been shown as mounted on the vehicle body and the link 34 connected with the running gear, the positions of these elements may be reversed without departing from the invention.

It is to be noted also that the shock absorber herein described is applicable generally to structures where relatively movable spring-actuated elements are used, or in other words the application of the device is not limited to motor vehicles only.

What I claim is:—

1. In a device of the character described, the combination with two members of a vehicle adapted to move toward and from each other, of a shock absorber therebetween, said shock absorber comprising a closed cylinder fixed against movement to one of said members, a piston reciprocably mounted in said cylinder capable of dividing the same into two communicating fluid-filled compartments, means within said cylinder for preventing rotation of said piston relative to said cylinder, an oscillating spindle mounted in said cylinder, a lever system connected to said spindle and the other one of said vehicle members, and a gearing for translating the oscillating movement of said spindle into linear movement of said piston.

2. In a device of the character described, the combination with two members of a vehicle adapted to move toward and from each other, of a shock absorber therebetween, said shock absorber comprising a closed cylinder fixed against movement to one of said members, a piston reciprocably mounted in said cylinder capable of dividing the same into two communicating fluid-filled compartments, means within said cylinder for preventing rotation of said piston relative to said cylinder, an oscillating spindle mounted in said cylinder, a lever system connected to said spindle and the other one of said vehicle members, and a screw-threaded connection between said spindle and piston for translating the oscillating movement of the former into linear movement of the latter.

Signed at New York in the county of New York and State of New York this 22nd day of October, A. D. 1921.

PORTER S. MORGAN.